Jan. 31, 1961 W. J. CROSHIER 2,969,597
SQUARENESS GAGE

Filed May 22, 1958 2 Sheets-Sheet 1

INVENTOR.
WALTER J. CROSHIER
BY
Darby & Darby
ATTORNEYS

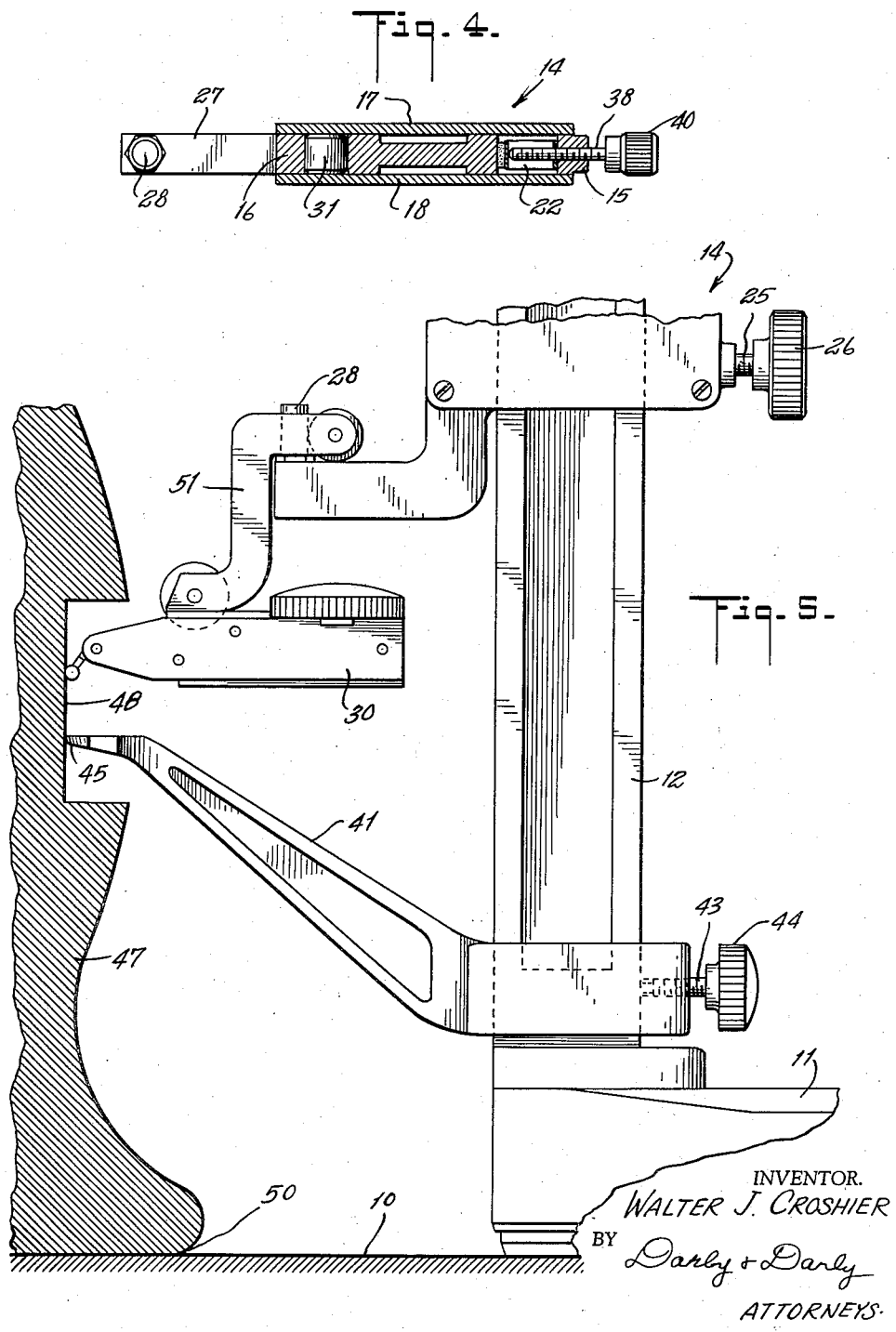

United States Patent Office 2,969,597
Patented Jan. 31, 1961

2,969,597
SQUARENESS GAGE

Walter J. Croshier, Hyde Park, N.Y., assignor to Standard Gage Company, Inc., Poughkeepsie, N.Y., a corporation of New York Filed May 22, 1958, Ser. No. 737,008

3 Claims. (Cl. 33—172)

The present invention relates to squareness gages and especially to such a gage formed by providing an attachment for a height comparator gage such as, that shown in Patent No. 2,827,707, issued March 25, 1958, and assigned to the assignee of the instant application.

In many instances it is desirable to test a workpiece to determine whether a vertical portion thereof is truly perpendicular with respect to a base or other supposedly horizontal portion. In the past this has most frequently been done by placing the work on a surface plate and moving a square against a supportedly vertical portion of a workpiece. If no light was visible between the vertically extending arm of the square and the vertical portion of the workpiece this indicated that two portions were in truth at right angles to each other. However, when light was seen between the vertical arm of the square and the workpiece this determined that the two surfaces tested were not perpendicular but gave no indication of the degree of variance. The present invention is intended for determining not only when supposedly perpendicular surfaces of a workpiece are not in that relationship, but also a means for determining how much the surfaces are out of square or vary from the perpendicular relationship desired.

An object of the invention is to provide a gage for determining the squareness of two surfaces of a workpiece, that is, to determine when the two surfaces are at exact right angles to one another.

It is another object of the invention to provide such a device which will indicate the degree of deviation from the desired right angle condition.

It is another object of the invention to provide such a device which is simple in construction and which is readily utilized.

It is a still further object of the invention to provide such a device which is essentially an attachment for a known height comparator gage.

Other objects and features of the invention will be apparent when the following description is considered in connection with the annexed drawings, in which.

Figure 3:
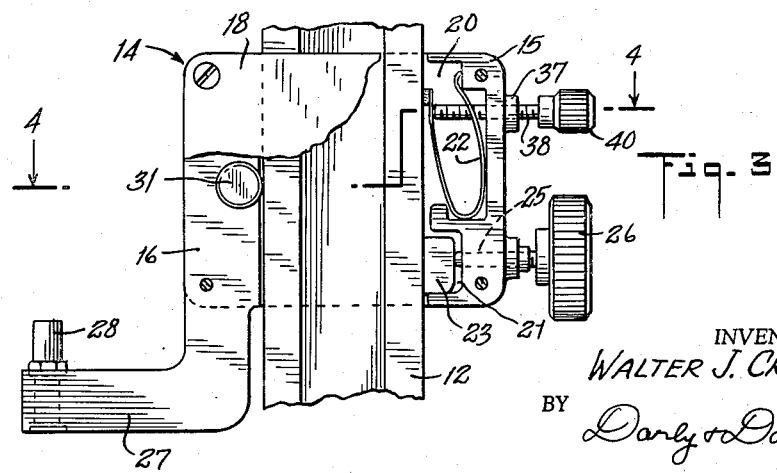
Figure 3 is an enlarged side elevational view of the slider member of the height comparator gage of Figure 1 showing particularly a modification thereof to lock the slider in a predetermined position with respect to the supporting rod.

Figure 4 is a horizontal cross-sectional view of the slider of Figure 3 showing the locking means of that figure, the view being taken on the plane of the line 4—4 of Figure 3; and Figure 5 is an enlarged side elevational view of the squareness gage illustrating a modified mounting of the dial indicator gage and illustrating also a modified mounting of the squareness attachment in order to enable the squareness of a surface recessed from the main body of the workpiece to be determined with respect to the base of the workpiece.

Referring now to the drawings, there is shown at 10 a flat surface such, for example, as the usual surface plate. Placed upon this surface is the squareness gage of my invention which comprises a base 11 having a rod 12 which, in this instance, is rectangular in cross-section, rigidly fixed thereto, the rod extending generally vertically. In order to reduce friction between the slide member later to be described and the supporting rod 12, the 12 is provided with depressions in its sides so that the slider bears against the outer margins of the side portions only. Mounted upon the verticaly extending rod 12 for sliding movement is the slide member 14 which comprises two end members 15 and 16 joined by the side plates 17 and 18.

The member 15 is shown particularly in Figure 3 and comprises a generally rectangular casting having two cavities 20 and 21 formed therein. Mounted in the cavity 20 is a leaf spring 22 having a generally U-shape. This spring is provided with a nylon button at its upper left hand end, this button having a shank which extends into an aperture formed in the spring and bearing against the adjacent edge of the supporting rod 12.

Mounted in the second cavity 21 is a small rectangular block 23, the left hand surface of which bears against the adjacent edge of the supporting rod 12. Threadedly mounted in a boss of the member 15 is a screw 25 which extends into the cavity 21 and bears against the right hand surface of the block 23. Screw 25 is provided with a knurled head 26 so that it may be readily operated.

Figure 1:
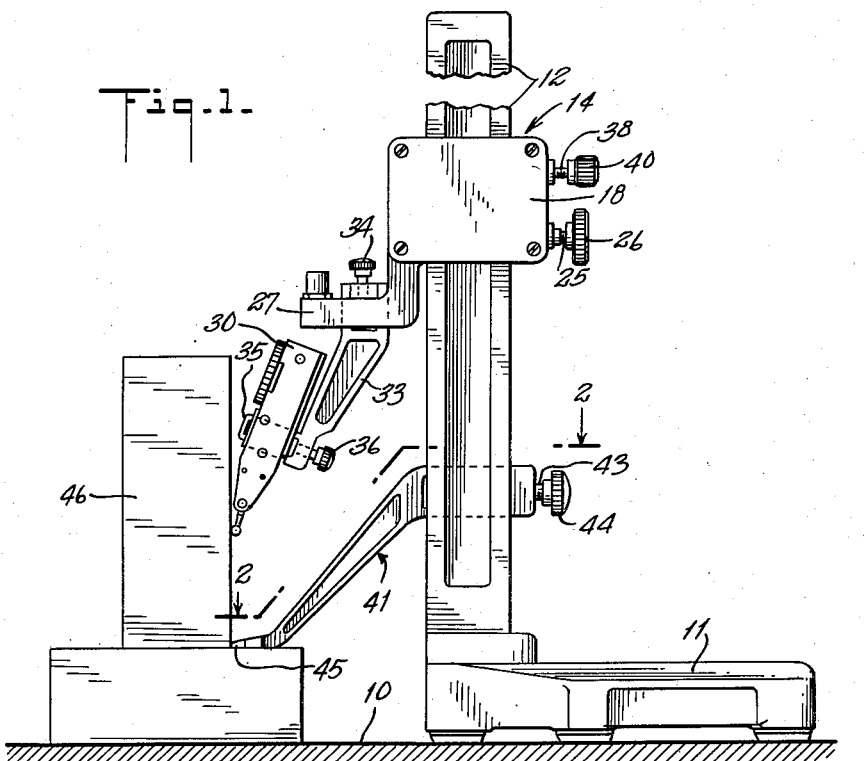
Figure 1 is a side elevational view of the squareness gage of my invention showing the gage being utilized to check the squareness of a workpiece.

Left hand member 16 of the slide 14 is formed in a generally L shape, the lower horizontal arm 27 of the L being provided with a stud 28 which may serve as a mounting for a dial indicator gage of usual type shown in Figures 1 and 5 and designated 30.

In a preferred form, however, the dial indicator gage is mounted upon a rigid bracket 33 clamped to the arm 27 by means of the screw 34, the indicator 30 being then in turn clamped to the bracket by means of the clamping member 35 and screw 36.

Mounted in an aperture adjacent the inner edge of the vertical portion of member 16 is a cylindrical plug-like member 31 preferably made of oil impregnated bronze though it may be made of steel or other material. As will be clear from the foregoing the slider 14 may be moved upwardly by exerting a pressure upon the lower edge of the member 15 which will cause the entire slider to rock about the plug 31 as a pivot and will therefore free the block from engagement with the adjacent side of the rod 12. Similarly, the slider may be adjusted in the downward direction by pressing against the upper edge of member 16 which will again rock the entire slider about the plug 31 in the same counterclockwise direction freeing it for movement downwardly. The slider will, however, be normally held in its adjusted position because the spring 22 exerts a pressure rocking the slide 14 about the plug 31 in a clockwise direction thus causing the block 23 to frictionally engage the adjacent edge of the rod 12.

Additionally, a boss 37 is formed on member 15 and a screw 38, having a knurled head 40, is threaded into a threaded central aperture in said boss. This screw extends through an aperture formed in the outer side of the spring 22 and bears against the inner side thus augmenting the pressure of the spring 22 and assuring that the slider 14 will be clamped against movement along the rod 12.

As is the case with the height comparator gage the screw 25 is effective to cause fine adjustment of the position of the dial indicator gage 30, since operation thereof alters the angular position of the entire slider with respect to the vertical rod 12.

Figure 2:
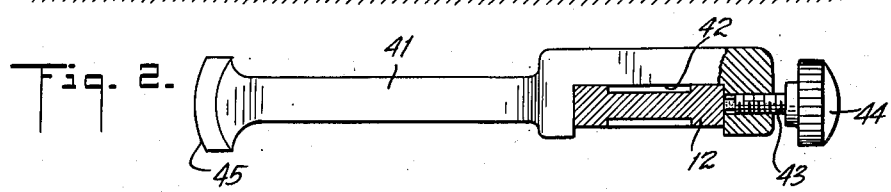
Figure 2 is a fragmentary cross-sectional view showing particularly the appearance of the attachment which converts the height gage to a squareness gage in top plan view.

Mounted on the upright rod 12 is a reference member 41 which is utilized in determining squareness. This member comprises a suitably formed arm which may be, for example, a casting having a depression formed therein as indicated at 42 in Figure 2. The depression 42 is open on its forward side and is of a size to fit closely about three sides of the rod 12. A locking screw 43 is threaded into the outer wall of the casting, the screw being provided with a knurled head 44 by means of which it can be tightened against the side surface of the upright rod 12 to lock the reference member 41 in a desired position. Reference member or arm 41 terminates in a portion 45 which lies in a plane parallel to the surface plate. This portion 45 has a curved edge which in the horizontal direction is convex outwardly (as viewed from the workpiece) the radius of curvature being great as compared to the radius of the indicator contact point. The curved reference surface thus provides for rolling contact of the master or workpiece therewith and for a "passing" reading of the dial indicator.

Arm 41 slopes downwardly as shown in Figure 1 for convenience in use. To explain this further, the bracket 33 slopes downwardly in order that the line of action on the contact point of the dial indicator 30 will be substantially horizontal, and in order that the reference surface 45 and the contact point may be positioned relatively closely together the reference member 41 is given a similar slope.

In using the gage described for checking squareness, the gage is placed upon a surface plate such as 10 and a master having a base exactly perpendicular to a vertically extending surface thereof is placed upon that plate. The master may, for example, be an exact right cylinder. The gage is brought against the master so that the surface 45 of the reference member 41 engages the side wall of the cylinder. The slider 14 is then adjusted to a desired height and the adjusting screw 26 operated so that the contact point of the gage engages the vertical surface of the master. By this means the indicator is positioned so that it reads near the middle of its range while the reference shoe or surface 45 is in contact with the work. Due to the curved surface 45 the master may be moved back and forth in contact therewith thus yielding a passing reading on the gage, the maximum being taken as the proper zero indication and the bezel of the gage being set so that the zero is at this point.

Thereafter the master is removed and a workpiece such as that shown at 46 in Figure 1 is moved into position with its vertically extending surface in contact with the reference member 41 and is moved back and forth along surface 45 thus also producing a passing reading on the indicator gage. The amount of deviation of that reading from the zero reading indicates the amount of variation from the truly perpendicular relationship of the base of the workpiece 46 and its vertically extending surface. It will be obvious that this deviation can be expressed in angular units or may, if desired, be expressed as a ratio of deviation to separation of the reference surface and of the indicator contact point expressed in units of length. In either event, of course, it is necessary to know the distance between the point of contact of the reference surface with the workpiece and the point of contact of the indicator contact with the workpiece.

As will be clear from Figure 1 the arrangement above described makes it entirely possible to determine the squareness of a workpiece which has a base portion of different dimensions than an upper portion thereof, which is substantially impossible in using a try square as has been the practice in the past. Moreover, the arrangement described wherein the reference arm or member 41 is adjustable along the vertical rod 12 is superior to an arrangement wherein the base 11 of the height comparator gage is extended to the left in Figure 1 to act as a reference surface, since with such an arrangement the limitations are the same as for the try square and a surface separated from the base cannot be checked for perpendicularity to that base.

In Figure 5 there is shown a slight modification of the arrangement which enables a workpiece such as that shown at 47 to be checked with respect to the perpendicular relation of a surface 48 thereof relative to the base 50. In this instance a somewhat modified bracket 51 is utilized, this bracket being clamped to the stud 28 and supporting the gage 30 in a substantially horizontal position. Also in this instance the reference member 41 is reversed so that it extends upwardly and outwardly from the rod 12. As will be readily seen by reference to Figure 5 the reference surface 45 and the contact point of the gage 30 may first be brought into contact with the wall of a master such as a right cylinder at the desired heights corresponding to the height of the recess 48 and may thereafter be used in the same manner as was described in connection with the workpiece 46 for checking the perpendicularity of the surface 48 with respect to the surface plate 10 and of course with respect to the lower surface of the base 50.

While I have described a preferred embodiment of the invention, it will be understood that I wish to be limited not by the foregoing description, but solely by the claims granted to me.

What is claimed is:

1. A precision gage for comparing the squareness of a master with that of a workpiece comprising, in combination, a base having an extended area adapted to be placed on a surface plate, a support rod extending generally vertically from said base, a dial indicator supporting slider mounted on said support rod, a dial indicator mounted on said slider, a reference member mounted for movement along said support rod, said member comprising an arm extending outwardly beyond said base and terminating in a portion extending parallel to the surface plate, said terminating reference portion being curved convexly outwardly in the horizontal direction, the radius of curvature being great as compared to the radius of the indicator contact, said dial indicator being positioned on said slider with its contact point in substantially vertical alignment with said reference surface, and means to rock said slider about said support rod to move said indicator to position the contact point thereof against the vertical surface of a master having a base at exact right angles to the vertical surface and placed on the surface plate on which said base is positioned, the vertical surface being in contact with said reference surface whereby said indicator may be set to a zero reading and the surface of the workpiece compared with the vertical surface of the master to determine the deviation of the workpiece surface from that of the master and thus determine the squareness of the workpiece, said curved reference surface serving to yield a passing reading as the master and workpiece are moved relative to the dial indicator contact point along said reference surface.

2. A precision gage for comparing the squareness of a master with that of a workpiece comprising, in combination, a base having an extended area adapted to be placed on a surface plate, a support rod extending generally vertically from said base, a reference member mounted for movement along said support rod, said member extending outwardly beyond said base and terminating in a reference surface, said reference member being normally inclined downwardly so that it may be positioned against a master or workpiece adjacent the surface plate on which the base is positioned, said reference member being reversible so that it may slope upwardly to make contact with a recessed vertical surface of a workpiece, a dial indicator supporting slider mounted on said support rod, a dial indicator mounted on said slider and positioned with its contact point in substantially vertical alignment with said reference surface and means to rock said slider about said support rod to move said indicator to position the contact point thereof against the vertical surface of a master having a base at exact right angles to the vertical surface and placed on the surface plate on which said base is positioned, the vertical surface being in contact with said reference surface whereby said indicator may be set to a zero reading, and the surface of the workpiece compared with the vertical surface of the master to determine the deviation of the workpiece surface from that of the master and thus determine the squareness of the workpiece.

3. A device in accordance with claim 2, wherein the dial indicator is supported on said slider by means of a bracket, said bracket sloping downwardly and generally parallel to the normal slope of said reference member.

References Cited in the file of this patent

UNITED STATES PATENTS

| | | |
|---|---|---|
| 1,073,089 | Bowers | Sept. 16, 1913 |
| 2,076,659 | Masson | Apr. 13, 1937 |
| 2,594,457 | Knuzler | Apr. 29, 1952 |
| 2,827,707 | Croshier et al. | Mar. 25, 1958 |

FOREIGN PATENTS

| | | |
|---|---|---|
| 1,046,962 | France | July 15, 1953 |

OTHER REFERENCES

Lakso: "Stand for Indicating Accuracy of Square," Machinery, April 24; p. 591. (Copy in Div. 66.)

UNITED STATES PATENT OFFICE
CERTIFICATION OF CORRECTION

Patent No. 2,969,597　　　　　　　　　　　　　　January 31, 1961

Walter J. Croshier

It is hereby certified that error appears in the above numbered patent requiring correction and that the said Letters Patent should read as corrected below.

Column 1, line 25, for "supportedly" read -- supposedly --; column 2, line 13, for "the 12 is" read -- the rod 12 is --

Signed and sealed this 13th day of June 1961.

(SEAL)
Attest:

ERNEST W. SWIDER
Attesting Officer

DAVID L. LADD
Commissioner of Patents